(12) United States Patent
Qu (10) Patent No.: US 7,912,723 B2
(45) Date of Patent: Mar. 22, 2011

(54) TALKING BOOK

(76) Inventor: Ping Qu, Shenzhen (CN)

( * ) Notice: Subject to any disclaimer, the term of this patent is extended or adjusted under 35 U.S.C. 154(b) by 1156 days.

(21) Appl. No.: 11/562,015

(22) Filed: Nov. 21, 2006

(65) Prior Publication Data

US 2007/0136066 A1    Jun. 14, 2007

(30) Foreign Application Priority Data

Dec. 8, 2005   (CN) .......................... 2005 1 0120606

(51) Int. Cl.
    *G10L 11/00*   (2006.01)
    *G06F 3/16*    (2006.01)
(52) U.S. Cl. ........................................ 704/270; 715/727
(58) Field of Classification Search .................. 704/270; 715/727
    See application file for complete search history.

(56) References Cited

U.S. PATENT DOCUMENTS

| | | | | |
|---|---|---|---|---|
| 4,278,838 A * | 7/1981 | Antonov | ...................... | 704/260 |
| 4,570,250 A * | 2/1986 | Gabritsos et al. | ............... | 369/97 |
| 5,136,505 A * | 8/1992 | Inamori et al. | ..................... | 704/4 |
| 5,517,407 A * | 5/1996 | Weiner | ............... | 704/1 |
| 5,991,711 A * | 11/1999 | Seno et al. | ........................ | 704/3 |
| 6,115,482 A * | 9/2000 | Sears et al. | ..................... | 382/114 |
| 6,434,518 B1 * | 8/2002 | Glenn | ............... | 704/3 |
| 6,901,255 B2 * | 5/2005 | Shostak | ..................... | 455/422.1 |
| 7,107,533 B2 * | 9/2006 | Duncan et al. | ................ | 715/727 |
| 2003/0033147 A1 * | 2/2003 | McCartney et al. | .......... | 704/260 |
| 2004/0186713 A1 * | 9/2004 | Gomas et al. | ................ | 704/235 |
| 2004/0210441 A1 * | 10/2004 | Clark | ............... | 704/272 |
| 2005/0276570 A1 * | 12/2005 | Reed et al. | ...................... | 386/46 |

* cited by examiner

*Primary Examiner* — David R Hudspeth
*Assistant Examiner* — Justin W Rider
(74) *Attorney, Agent, or Firm* — Matthias Scholl P.C.; Matthias Scholl (57) ABSTRACT

A combination of a book and a voice phonation apparatus comprising a book having a plurality of pages, at least one of which is carrying a plurality of printed words and a plurality of specific codes associated with said words, said printed words being divided into a plurality of specific segments; and a voice phonation apparatus forming an integral part of said book and comprising (i) a housing with a plurality of switches and a plurality of keys, (ii) a voice output unit, and (iii) a control unit having a memory for storing data representing spoken words and connected to said switches, said keys, and said voice output unit.

9 Claims, 2 Drawing Sheets

TALKING BOOK

BACKGROUND OF THE INVENTION

1. Field of the Invention

This invention relates to a talking book and more particularly to a combination of a book and a voice phonation apparatus.

2. Description of the Related Art

Current talking books allow for phonating of entire book pages. However, these types of talking books are not easily adaptable to being used as talking dictionaries or language learning tools where only single words or phrases may need to be phonated, and when words and phrases may need to be repeated or repeated continuously.

SUMMARY OF THE INVENTION

Therefore, it is one objective of the present invention to provide a combination of a book and a voice phonation apparatus adopting a code key-press input and search method with the advantages of free text input, quick search, low cost, convenient operation, and portability.

To achieve the above objective, in accordance with one embodiment of the present invention, there is provided a combination of a book and a voice phonation apparatus comprising a housing, a voice output unit, and a control unit having a microprocessor and an electronic circuit set therein, wherein the electronic circuit is connected respectively to the voice output unit.

The combination of a book and a voice phonation apparatus in accordance with the present invention comprises a book having a plurality of pages, at least one of which is carrying a plurality of printed words and a plurality of codes associated with the words, the printed words being divided into a plurality of segments; and a voice phonation apparatus forming an integral part of the book and comprising (i) a housing with a plurality of switches and a plurality of keys (for example, at least ten digital input keys from 0 to 9), (ii) a voice output unit, and (iii) a control unit having a memory for storing data representing spoken words and connected to the switches, the keys, and the voice output unit; wherein the control unit is capable of assuming a plurality of operational modes and carrying out at least the following steps: (i) receiving the codes inputted via the keys into the control unit; (ii) causing the control unit to extract the data representing spoken word(s) associated with the codes from the memory; and (iii) causing the voice output unit to audibly reproduce the spoken word(s).

In certain class of this embodiment, the spoken words contain one or more of: characters, words, phrases, sentences, articles, and songs in at least one language and an intertranslation into at least one additional language.

In certain class of this embodiment, the switches comprise one or more of the following: a POWER ON/RESET switch, a POWER OFF switch, a REPEAT switch, a CONTINUOUS READ switch, a PAUSE switch, a LANGUAGE SELECTOR switch, a VOLUME SETTING switch, a KEYPAD TONE SETTING switch; wherein the POWER ON/RESET switch and the POWER OFF switch are preferential operating switches; and pressing any one of the preferential switches interrupts any operational modes assumed by the control unit.

In certain class of this embodiment, the operational modes comprise one or more of standby mode, setting mode, and segment operation mode; and the segment operation mode further comprises one or more of single read mode, repeat mode, continuous read mode, and semi-reset mode.

In certain class of this embodiment, the standby mode is assumed when the POWER ON/RESET switch is pressed; the REPEAT switch, the CONTINUOUS READ switch, and the PAUSE switch are disabled in the standby mode; the setting mode allows for selecting a language in which the spoken words are read by pressing the LANGUAGE SELECTOR switch; pressing the VOLUME SETTING switch or a combination of the keys allows for an increase or a decrease of the volume of spoken words or key tones audibly reproduced by the voice output unit; optionally, pressing of any of the switches or keys causes the voice output unit to audibly display a key tone after the KEYPAD TONE SETTING switch or a combination of the keys is pressed; and the standby mode is assumed automatically after the setting mode is completed.

In certain class of this embodiment, the code is selected from a segment code and a word code each having one or two numeric digits; the segment code is inputted first followed by the word code; the segment operation mode is assumed when the segment code is inputted as a two digit number, the segment code is inputted as a one digit number and no other keys are pressed for a predetermined amount of setting time, 0 is inputted, or an invalid word code is inputted; the word code can only be inputted in the segment operation mode; the REPEAT switch, the CONTINUOUS READ switch, and the PAUSE switch are disabled during the predetermined amount of setting time; the standby mode is assumed when 0 or an invalid segment code is inputted, or the POWER ON/RESET switch is pressed.

In certain class of this embodiment, while in a single read mode, if the word code inputted is a two digit number, a spoken word corresponding to the word code will be audibly reproduced immediately; if the word code inputted is a one digit number, a spoken word corresponding to the word code will be audibly reproduced after the predetermined amount of setting time but only if no other switch or key is pressed during the predetermined amount of setting time; the REPEAT switch, the CONTINUOUS READ switch, or the key(s) can be inputted during the predetermined amount of setting time, but if the REPEAT switch and the CONTINUOUS READ switch are inputted only the first inputted switch will be valid; if one the key is inputted and no other key is pressed during the predetermined amount of setting time, a spoken word corresponding to a word code corresponding to one the digit inputted will be audibly reproduced immediately; if multiple keys are inputted during the predetermined amount of setting time, a spoken word corresponding to a word code comprised of first two digits inputted will be audibly reproduced immediately; the PAUSE switch is invalid.

In certain class of this embodiment, while in the single read mode, when pressing the REPEAT switch, the single read mode will be repeated once after it is finished and the semi-reset mode has been entered upon which the semi-reset mode will be entered automatically; while in the semi-reset mode, when pressing the REPEAT switch, the single repeat mode executed last will be repeated upon which the semi-reset mode will be entered automatically.

In certain class of this embodiment, while in a single read mode, when pressing the CONTINUOUS READ switch, the continuous read mode will be assumed immediately once the semi-reset mode is assumed after the operation of single read mode is finished so as to audibly reproduce spoken words starting from the word following the word currently being audibly reproduced and ending with the last word in the segment; while in a semi-reset mode, when pressing the CONTINUOUS READ switch, the continuous read mode will be assumed immediately so as to audibly reproduce spoken words starting from the word being audibly reproduced last and ending with the last word in the segment; the semi-reset mode will be operated automatically after the operation of continuous read mode is finished; if the PAUSE switch is pressed during audible reproducing of words, the continuous read mode will be paused immediately once the phonation of current voice is finished; if the PAUSE switch is pressed many times, only the odd pressings are valid; if the PAUSE switch is pressed within the interval of setting time after the phonation of the voice is finished, the continuous read mode will be paused immediately, and will be continued by pressing the PAUSE key again; the REPEAT switch, the CONTINUOUS READ switch, and the keys are invalid under the continuous read mode; and the continuous read mode is interrupted immediately by pressing the POWER ON/RESET key and the semi-reset mode is assumed immediately.

In certain class of this embodiment, the semi-reset mode is assumed automatically after the single read mode, the repeat mode, or the continuous read mode is finished, or by pressing the POWER ON/RESET switch during the continuous read mode; while in the semi-reset mode, the original inputted voice can be repeated or read continuously and another voice code also can be inputted; and pressing the POWER ON/RESET switch interrupts the semi-reset mode immediately and the standby mode is assumed immediately.

In other aspects of the invention provided is a method for authoring a combination of a book and a voice phonation apparatus comprising (a) providing a voice phonation apparatus forming an integral part of a book and comprising (i) a housing with a plurality of switches and a plurality of keys, (ii) a voice output unit, and (iii) a control unit having a memory for storing data representing spoken words and connected to the switches, the keys, and the voice output unit; (b) providing the book having a plurality of pages, at least one of which is carrying a plurality of printed words and a plurality of codes associated with the words, the printed words being divided into a plurality of segments; (c) recording the data representing spoken words in the memory; and (d) performing a digital classification by associating a code with each the data representing spoken words to be phonated by the voice output unit.

In other aspects of the invention provided is a method of interactive learning comprising (a) providing a combination of a book and a voice phonation apparatus comprising: a book having a plurality of pages, at least one of which is carrying a plurality of printed words and a plurality of codes associated with the words, the printed words being divided into a plurality of segments; and a voice phonation apparatus forming an integral part of the book and comprising (i) a housing with a plurality of switches and a plurality of keys, (ii) a voice output unit, and (iii) a control unit having a memory for storing data representing spoken words and connected to the switches, the keys, and the voice output unit; wherein the control unit is capable of assuming a plurality of operational modes and carrying out at least the following steps: (i) receiving the codes inputted via the keys into the control unit; (ii) causing the control unit to extract the data representing spoken word(s) associated with the codes from the memory; and (iii) causing the voice output unit to audibly reproduce the spoken word(s); (b) inputting the codes via the keys into the control unit; (c) causing the control unit to extract the data representing spoken word(s) associated with the codes from the memory; and (d) causing the voice output unit to audibly reproduce the spoken word(s).

In certain class of this embodiment, the spoken words contain one or more of: characters, words, phrases, sentences, articles, and songs in at least one language and an intertranslation into at least one additional language.

In certain class of this embodiment, the switches comprise one or more of the following: a POWER ON/RESET switch, a POWER OFF switch, a REPEAT switch, a CONTINUOUS READ switch, a PAUSE switch, a LANGUAGE SELECTOR switch, a VOLUME SETTING switch, a KEYPAD TONE SETTING switch; wherein the POWER ON/RESET switch and the POWER OFF switch are preferential operating switches; and pressing any one of the preferential switches interrupts any operational modes assumed by the control unit.

In certain class of this embodiment, the operational modes comprise one or more of standby mode, setting mode, and segment operation mode; and the segment operation mode further comprises one or more of single read mode, repeat mode, continuous read mode, and semi-reset mode.

In certain class of this embodiment, the standby mode is assumed when the POWER ON/RESET switch is pressed; the REPEAT switch, the CONTINUOUS READ switch, and the PAUSE switch are disabled in the standby mode; the setting mode allows for selecting a language in which the spoken words are read by pressing the LANGUAGE SELECTOR switch; pressing the VOLUME SETTING switch or a combination of the keys allows for an increase or a decrease of the volume of spoken words or key tones audibly reproduced by the voice output unit; optionally, pressing of any of the switches or keys causes the voice output unit to audibly display a key tone after the KEYPAD TONE SETTING switch or a combination of the keys is pressed; and the standby mode is assumed automatically after the setting mode is completed.

In certain class of this embodiment, the code is selected from a segment code and a word code each having one or two numeric digits; the segment code is inputted first followed by the word code; the segment operation mode is assumed when the segment code is inputted as a two digit number, the segment code is inputted as a one digit number and no other keys are pressed for a predetermined amount of setting time, 0 is inputted, or an invalid word code is inputted; the word code can only be inputted in the segment operation mode; the REPEAT switch, the CONTINUOUS READ switch, and the PAUSE switch are disabled during the predetermined amount of setting time; the standby mode is assumed when 0 or an invalid segment code is inputted, or the POWER ON/RESET switch is pressed.

In certain class of this embodiment, while in a single read mode, if the word code inputted is a two digit number, a spoken word corresponding to the word code will be audibly reproduced immediately; if the word code inputted is a one digit number, a spoken word corresponding to the word code will be audibly reproduced after the predetermined amount of setting time but only if no other switch or key is pressed during the predetermined amount of setting time; the REPEAT switch, the CONTINUOUS READ switch, or the key(s) can be inputted during the predetermined amount of setting time, but if the REPEAT switch and the CONTINUOUS READ switch are inputted only the first inputted switch will be valid; if one the key is inputted and no other key is pressed during the predetermined amount of setting time, a spoken word corresponding to a word code corresponding to one the digit inputted will be audibly reproduced immediately; if multiple keys are inputted during the predetermined amount of setting time, a spoken word corresponding to a word code comprised of first two digits inputted will be audibly reproduced immediately; the PAUSE switch is invalid.

In certain class of this embodiment, while in the single read mode, when pressing the REPEAT switch, the single read mode will be repeated once after it is finished and the semi-reset mode has been entered upon which the semi-reset mode will be entered automatically; while in the semi-reset mode, when pressing the REPEAT switch, the single repeat mode executed last will be repeated upon which the semi-reset mode will be entered automatically.

In certain class of this embodiment, while in a single read mode, when pressing the CONTINUOUS READ switch, the continuous read mode will be assumed immediately once the semi-reset mode is assumed after the operation of single read mode is finished so as to audibly reproduce spoken words starting from the word following the word currently being audibly reproduced and ending with the last word in the segment; while in a semi-reset mode, when pressing the CONTINUOUS READ switch, the continuous read mode will be assumed immediately so as to audibly reproduce spoken words starting from the word being audibly reproduced last and ending with the last word in the segment; the semi-reset mode will be operated automatically after the operation of continuous read mode is finished; if the PAUSE switch is pressed during audible reproducing of words, the continuous read mode will be paused immediately once the phonation of current voice is finished; if the PAUSE switch is pressed many times, only the odd pressings are valid; if the PAUSE switch is pressed within the interval of setting time after the phonation of the voice is finished, the continuous read mode will be paused immediately, and will be continued by pressing the PAUSE key again; the REPEAT switch, the CONTINUOUS READ switch, and the keys are invalid under the continuous read mode; and the continuous read mode is interrupted immediately by pressing the POWER ON/RESET key and the semi-reset mode is assumed immediately.

In certain class of this embodiment, the semi-reset mode is assumed automatically after the single read mode, the repeat mode, or the continuous read mode is finished, or by pressing the POWER ON/RESET switch during the continuous read mode; while in the semi-reset mode, the original inputted voice can be repeated or read continuously and another voice code also can be inputted; and pressing the POWER ON/RESET switch interrupts the semi-reset mode immediately and the standby mode is assumed immediately.

The voice phonation apparatus of the present invention adopts code key-press input and search method free from text input, providing the advantages of quick search, simple configuration, low cost, and convenient to operation. It can be used widely for the learning and communication of words, phrases, articles, and songs of various national languages, so as to improve the language learning of various nations and drive the harmonic cooperation of international community.

BRIEF DESCRIPTION OF THE DRAWINGS

Preferred embodiments of the present invention will hereinafter be described in more detail with reference to the accompanying drawings, in which.

DETAILED DESCRIPTION OF THE INVENTION

A combination of a book and a voice phonation apparatus that can phonate 1000 frequently used English words is provided, comprising a housing having a plurality of switches and keys, a voice output unit, and a control unit having a memory for storing data representing spoken words, wherein the control unit is connected to the voice output unit and the plurality of switches and keys.

The memory contains 1000 English words that can be phonated and their corresponding Chinese translation, such as father corresponds to BABA in Chinese translation, mother—MAMA, brother—XIONGDI, head—TOU, face—LIAN, leg—TUI, listen—TING, say—SHUO, know—ZHIDAO, and so on.

Setting digital and segment identification codes for the above 1000 words, namely performing digital classification and coding, as follows:
the first segment: 1—father BABA, 2—mother MAMA . . . , 20—brother XIONGDI;
the second segment: 1—head TOU, 2—face LIAN . . . , 20—leg TUI;
. . .
the fiftieth segment: 1—listen TING, 2—say SHUO . . . , 20—know ZHIDAO.

Printing the coded English words and their corresponding explanations into wordbook, recording the voices sequenced by code in standard pronunciation, and saving them into memory in association with the digital codes.

When in use, the words to be phonated from the wordbook are selected by inputting the corresponding segment code and word code by code key-press input and search method, the corresponding pronunciation of a word will be sought out from the memory by the control unit and then phonated in standard English pronunciation (or in any other language or a combination of languages depending on selection) through the at least one speaker controlled by the electronic circuit; as required. For example, the Chinese translation of the voice corresponding to the English words also can be phonated.

The wordbook comprises a cardboard outer covering, an imitating genuine leather jacket, and a lot of inside pages, wherein said inside pages consists of index pages, word pages, identification keys, and appendix, said word pages further contain segment codes and definitions, English word codes, English words and their corresponding Chinese translations.

The voice phonation apparatus is fixed within the wordbook, and includes a control unit, at least one speaker and a code display screen. The number of 1 to 99 can be inputted to the code display screen, while 0 is an invalid input. By the main program of the control unit calling the subprogram of display output, the digital number to be displayed is outputted through the display output port and is transformed through the display module and then is displayed on the LCD (liquid crystal display) screen.

The control unit includes a memory cell, an input port, an output port, and a program embedded therein. The apparatus is shut down automatically if it is not in operation within any 1 minute.

The capacity of the memory cell is 15 minutes, and is divided into 50 segments, each segment contains 20 words, each word lasts 0.9 s, and totally the memory cell contains 1000 voices.

Figure 1:
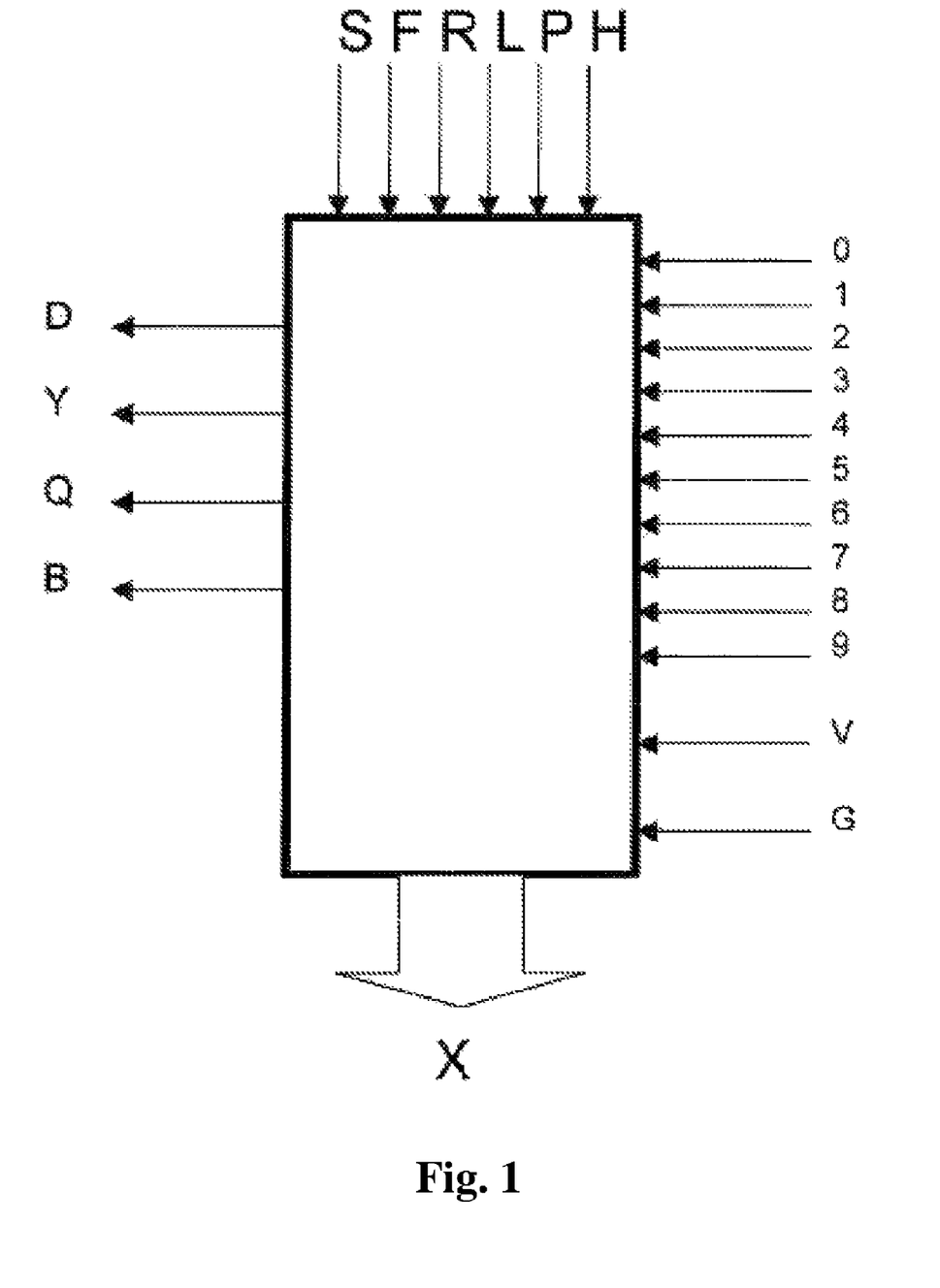
FIG. 1 illustrates a control unit in accordance with one embodiment of the present invention including its the input and output ports.
Figure 2:
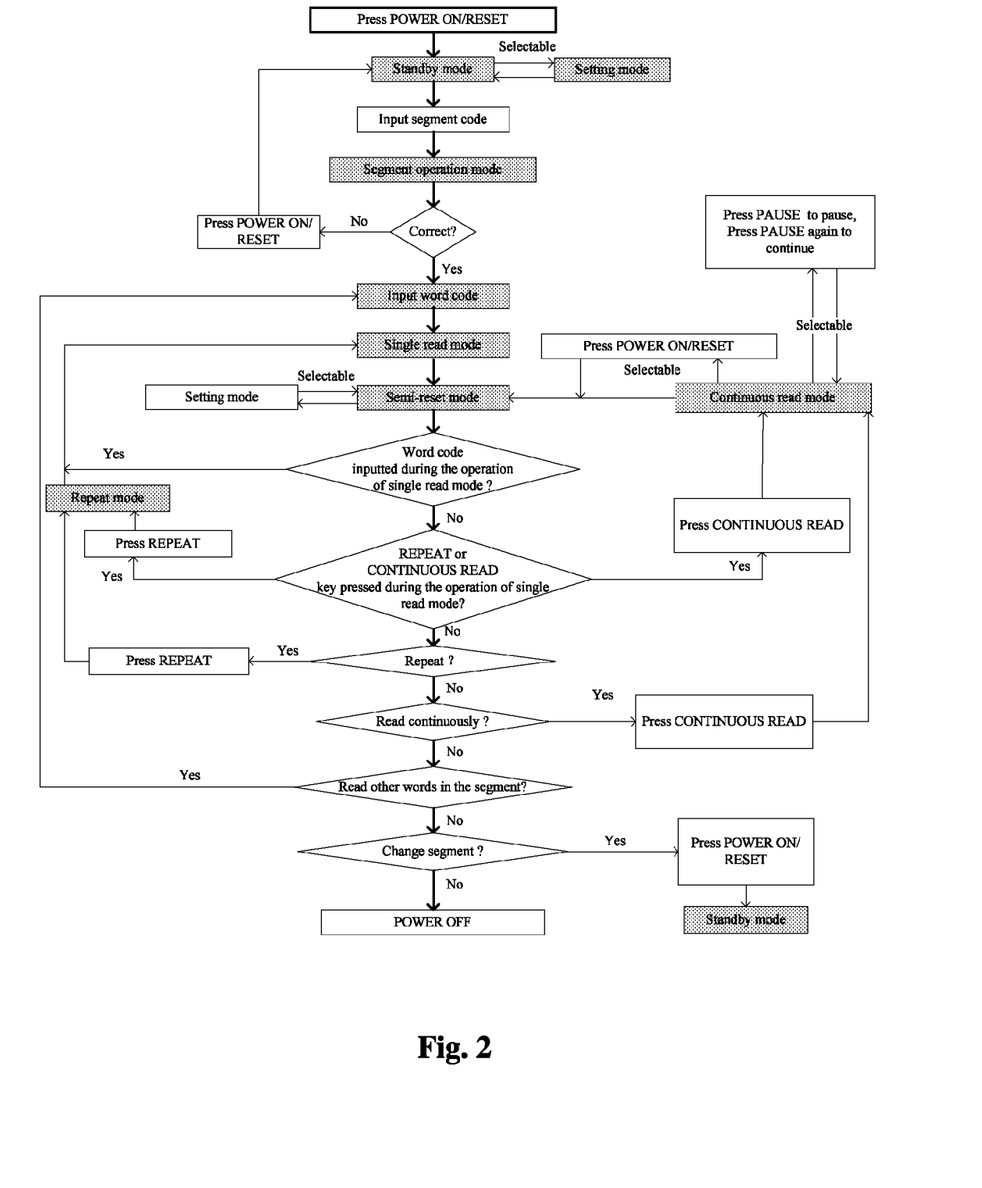
FIG. 2 is an operation flow chart in accordance with one embodiment of the present invention.

Referring to FIG. 1, there are 17 input ports altogether, respectively for power V, ground G, power on/reset S, power off F, repeat R, continuous read L, pause P, language switch H and ten digits keys from 0 to 9; the functional switches are respectively POWER ON/RESET switch, POWER OFF switch, REPEAT switch, CONTINUOUS READ switch, PAUSE switch, LANGUAGE switch, VOLUME SETTING switch, and KEYPAD TONE switch, all switches and keys are electrically connected, all input ports are valid under the conditions of high voltage input.

There are 5 output ports altogether, respectively for speaker Q, keypad tone B, display X, power indicator D, and segment code indicator Y.

The program consists of one main program and 8 subprograms. The 8 subprograms are respectively for power on/reset control, power off control, display output, speaker volume control, speaker sound output, language switch output, keypad tone control, and segment operating control.

The operational modes of the control unit comprise a standby mode, a setting mode, and a segment operation mode, wherein the segment operation mode comprises a single read mode, a repeat mode, a continuous read mode, and a semi-reset mode; under the continuous read mode, the operations of continuous read and pause can be started or cancelled.

The POWER ON/RESET and POWER OFF are preferential switches. The operation will be reset or shut down immediately once the POWER ON/RESET or POWER OFF switch is pressed under any operation mode. In the standby mode, the REPEAT switch, CONTINUOUS READ switch, and PAUSE switch are invalid, the POWER ON/RESET switch is valid, and the display screen will flicker the number of 0 one time once the POWER ON/RESET key is pressed.

The standby mode will be operated once the POWER ON/RESET switch is pressed, the control unit will be in a state of awaiting for the input of segment code of the voice to be phonated in the voice output unit. The rechargeable battery will be started after the apparatus is powered on so as to supply the power input port V of the control unit with +3.6V power. The control unit will then come into operation, and in the meantime, the reset input port S of the control unit is supplied with high voltage. Once the main program of the control unit detects that the reset input port S of the control unit is supplied with a high voltage, the subprogram of power on/reset will be started so as to supply the output port Y of the indicator of segment code with a low voltage so that the indicator of segment code will not work, and in the meantime, the subprogram of display output will be called so as to send the number 0 to the display output port X, which is then displayed on the LCD screen. The control unit is then in a state of awaiting for the input of segment code.

The selectable setting mode can be operated under the standby mode, the default setting can be changed by pressing randomly one or more of the following LANGUAGE SELECTION switch, KEYPAD TONE switch, and VOLUME SETTING switch. The default factory settings are English output, with keypad tone output, and medium speaker volume output. The control unit will memorize the operation settings once the parameters are set, the operation settings will be the default settings when the apparatus is powered on next time, and can be stored permanently. The standby mode will be assumed automatically once the setting is finished.

By pressing the LANGUAGE SELECTOR switch, the main program of the control unit detects that the language switch input port H of the control unit is supplied with a high voltage, the subprogram of the display output will be called so as to send the number 0 to the display output port X, which is then displayed on the LCD screen. In the meantime, the subprogram of language switch control will be started, the corresponding language voice in the memory cell will be in a state of readiness. The corresponding memory cell will be changed once the LANGUAGE SELECTOR switch is pressed. Accordingly, the output language can be English, Chinese, or English-Chinese bilingual.

By pressing the KEYPAD TONE switch, or selecting keys 98 combined by the digital keys 9 and 8, the main program of the control unit detects that the number at the digital input port of the control unit is 98, the subprogram of display output will be called so as to send the number of 98 to the display output port X, which is then displayed on the LCD screen. In the meantime, the subprogram of keypad tone control is started so as to supply a voltage to the output port B of keypad tone control of the control unit, the voltage will be changed once the 98 is pressed, and correspondingly, the output of the keypad tone is with and without sound respectively.

By pressing the VOLUME switch or pressing keys 99, combined by pressing the digital key 9 two times, the main program of the control unit detects that the number at the digital input port of the control unit is 99, the subprogram of display output will be called so as to send the number 99 to the display output port X, which is then displayed on the LCD screen. In the meantime, the subprogram of the speaker volume control is started so as to supply a voltage to the volume output port Q of the speaker of the control unit, the voltage will be changed once the keys 99 are pressed, and correspondingly, the volume output of the speaker is high, medium, and low.

Under the standby mode, the segment operation mode will be operated if the segment code inputted is valid. If the segment code inputted is a two-digital number, for example, is 12, the indicator of segment code will work so as to indicate that the segment mode is being operated; if the inputted segment code is a one-digital number, for example, is 2, and no other digital key is pressed within the setting time such as 0.5 s, then the current segment will be the default segment. If the main program of the control unit in standby mode detects that the number at the digital input port of the control unit is 2, the subprogram of the segment operation control will be started to set 2 as the segment code. At the same time, the second segment in the memory cell corresponding to the segment code 2 will be started, so that the voice of all words in the segment will be in a state of readiness. In the meantime, the subprogram of display output is called so as to send the number of 2 to the display output port X, which is then displayed on the LCD screen, the indicator of segment code will work so as to indicate the segment mode is being operated. Within the setting time such as 0.5 s, the REPEAT switch, CONTINUOUS READ switch, and PAUSE switch are invalid. The standby mode will be operated automatically if 0 or invalid segment code is inputted.

In the segment operation mode, the indicator of the segment code is operational, and the LCD screen displays the segment code and is in a state of awaiting for the input of the word code. The segment operational mode will be operated automatically when 0 or invalid word code is inputted, and the LCD screen will display the number 0. By pressing the POWER ON/RESET switch, the main program of the control unit under the standby mode detects that the input port of the POWER ON/RESET switch of the control unit is supplied with a high voltage, the control subprogram of the POWER ON/RESET switch will be started, and then the standby mode will be operated automatically.

In the segment operational mode, the single read mode will be operated when a valid word code is inputted. If the word code inputted is a two-digital number, for example, is 13, the word corresponding to the code will be phonated immediately. If the word code inputted is a one-digital number, for example, is 3, and no other digital keys are pressed within the setting time such as 0.5 s, the number of 3 will be defaulted, the subprogram of the segment operation control of the control unit detects that the number at the digital input port of the control unit is 3, the word 3 in the second segment of the memory cell corresponding to the segment code 2 will be started and phonated through the output port Q of the speaker in a volume controlled by the subprogram of the speaker volume control. In the meantime, the subprogram of display output will be called so as to send a number of 3 to the display output port X, which is then displayed on the LCD screen. The semi-reset mode will be operated automatically within 1 s after the phonation of the word is finished, namely, the LCD screen will display the original word code. Within the setting time such as 0.5 s, the REPEAT switch and CONTINUOUS READ switch can be pressed. During the operation of single read mode, the REPEAT and CONTINUOUS READ switches can be pressed or other word code can be inputted. If the REPEAT switch or CONTINUOUS READ switch is firstly pressed, only the first press is valid while other presses are invalid. If a digital key is firstly pressed, and no other digital key is pressed within the setting time such as 0.5 s, the pressed number will be defaulted. If multiple digital keys are pressed, the numbers on the first two keys pressed within the interval of setting time such as 0.5 s are defaulted, and will be operated immediately once the semi-reset mode is operated after the operation of single read mode is finished. The PAUSE key is invalid in single read mode.

During the operation of single read mode or under the semi-reset mode, the repeat mode will be operated by pressing the REPEAT switch. For example, during the operation of single read mode with a segment code of 2 and a word code of 3, by pressing the REPEAT switch, the subprogram of segment operation control of the control unit under segment operation mode detects that the repeat input port R of the control unit is supplied with a high voltage, the repeat mode will be operated immediately once the semi-reset mode is operated automatically after the operation of single read mode of the word code 3 is finished, namely, the word 3 in the second segment of the memory cell corresponding to the segment code 2 will be operated again, and the word 3 will be phonated through the output port of the speaker, and the display on the LCD screen continues to display the number 3. After the operation of repeat mode is finished, the semi-reset mode will be entered automatically. Under the semi-reset mode, the repeat mode will be operated immediately once the REPEAT key is pressed; once the operation of repeat mode is finished, the semi-reset mode will then be entered automatically.

During the operation of the single read mode or under the semi-reset mode, the continuous read mode will be operated by pressing the CONTINUOUS READ switch. For example, during the operation of single read mode with a segment code of 2 and a word code of 3, by pressing the CONTINUOUS READ switch, the subprogram of the segment operation control of the control unit under segment operation mode detects that the continuous read input port L of the control unit is supplied with a high voltage. The continuous read mode will be operated immediately once the semi-reset mode is entered automatically after the operation of single read mode of word code 3 is finished, namely, phonation of the words corresponding to the word codes from 4 to 20 will be started continuously with an time interval of 1 s. Under the semi-reset mode, by pressing the CONTINUOUS READ switch, the phonation from the original word code 3 will be started continuously. The semi-reset mode will be operated automatically after the operation of continuous read mode is finished.

During the phonation of a word within the continuous read mode, if the PAUSE key is pressed one or more times, only the odd pressings are valid. The subprogram of segment operation control of the control unit under the segment operation mode detects that the pause input port P of the control unit is supplied with a high voltage, the subprogram of the pause control will be called, after the phonation of the word is finished, the pause mode will be operate. Within the time range of about 1~60 s, by pressing the PAUSE key once again, the subprogram of the segment operation control of the control unit detects that the pause input port P of the control unit is supplied again with a high voltage, the subprogram of the pause control will be called so as to cancel the pause mode and continue to operate the continuous read mode. The REPEAT switch, CONTINUOUS READ switch, and digital keys are invalid within the operation of the continuous read mode. During the operation of the continuous read mode, by pressing the POWER ON/RESET switch, the main program of the control unit under continuous read mode detects that the input port for the power on/reset switch of the control unit is supplied with a high voltage, the subprogram of the power on/reset control will be started so as to interrupt the operation, and therefore, the semi-reset mode will again be entered automatically.

The semi-reset mode will be entered after the operation of the single read mode, repeat mode or the continuous read mode is finished or by pressing the POWER ON/RESET switch within the operation of the continuous read mode, and the original word code will be displayed on the LCD screen. In the semi-reset mode, the setting mode as well as the repeat mode or continuous read mode on the original word also can be operated, or another word code can be inputted so that various operations can be performed. Under the semi-reset mode, by pressing the POWER ON/RESET switch, the operation will be interrupted immediately, and the standby mode will be entered automatically.

The operations of single read, repeat, and continuous read for the word 3 of the second segment, the word 20 of the second segment, and the word 2 of the eleventh segment will be exemplified as follows:

(1) powering firstly the apparatus on, the power indicator will work, while the indicator of segment code will not work, and the number of 0 will be displayed on the LCD screen;

(2) pressing the LANGUAGE SELECTOR switch two times so as to set the voice output as English-Chinese bilingual; inputting the number of 98 combined by digital keys to set that there is no keypad tone output; inputting the number of 99 combined by digital keys to set that the volume output of the speaker is high;

(3) inputting segment code 2, the indicator of segment code works, the number of 2 is displayed on the LCD screen; inputting word code 3, the number of 3 will be displayed on the LCD screen; operating the single read mode of word 3, the English and Chinese phonations of word 3 will be outputted orderly through the output port of the speaker, the semi-reset mode will be entered automatically after the phonation is finished, the number displayed on the LCD screen remains 3.

If the word 3 needs to be repeated, pressing the REPEAT switch during the operation of single read mode of word 3 so as to perform the repeat operation of word 3, namely, the single read operation of word 3 will be performed one more time, the semi-reset mode will be operated automatically after the operation of single read mode is finished.

If the words from 3 to 20 need to be read continuously, pressing the CONTINUOUS READ switch during the operation of the single read mode of word 3 so as to enter semi-reset mode automatically after the operation of single read mode of word 3 is finished, then the operation of continuous read of words from 4 to 20 will be started at once, the interval between the single read of each word is 1 s; the semi-reset mode will be operated automatically after the operation of continuous read mode is finished.

If the operation of the continuous read mode needs to be paused, for example, the operation needs to be paused after the single read of word 10 is finished, if the PAUSE key is pressed one or more odd times during the operation of single read of word 10, the operation will be paused immediately after the phonation of word 10 is finished; if the PAUSE key is pressed within 1 s after the phonation of word 10 is finished, the operation will be paused immediately. The operation of continuous read mode will be resumed once the PAUSE key is pressed again.

If the operation of the continuous read mode needs to be interrupted and exited, for example, if the operation needs to be exited after the single read of word 10 is finished, by pressing the POWER ON/RESET key during the operation of single read mode, or within 1 s after the phonation of word 10, the operation will be interrupted immediately, the number of 3 will be displayed on the LCD screen, and the semi-reset mode will be entered automatically.

In the semi-reset mode with the number of 3 displayed on the LCD screen, if the phonation of word 3 needs to be repeated, by pressing the REPEAT switch, the word 3 will be phonated once again; if the words need to be read continuously, by pressing the CONTINUOUS READ switch, the phonation of the words from 4 to 20 will be started immediately, with a time interval between two words being 1 s. The semi-reset mode will be entered automatically after the operation of continuous read is finished.

(4) In the semi-reset mode with the number of 3 displayed on the LCD screen, inputting the number of 20, which will then be displayed on the LCD screen; the single read mode of the word 20 will be operated, and the phonation of word 20 will be outputted through the output port of the speaker, the display on the LCD screen is kept unchanged as 20, the semi-reset mode will be entered automatically after the operation of single read mode is finished. The REPEAT switch can be pressed so as to repeat the phonation of word 20. There are only 20 words on the second page. If the CONTINUOUS READ switch is pressed, only the phonation of word 20 can be repeated.

(5) Pressing the POWER ON/RESET switch, the indicator of segment code will not work, and the number of 0 will be displayed on the LCD screen; then repeating the steps of (3) and (4), the single read, repeat, and continuous read of word 2 in eleventh segment can be operated by changing the input of segment code and word code only.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A combination of a book and a voice phonation apparatus comprising:

a book having a plurality of pages, at least one of which is carrying a plurality of printed words and a plurality of codes associated with said words, said printed words being divided into a plurality of segments; and a voice phonation apparatus forming an integral part of said book and comprising (i) a housing with a plurality of switches and a plurality of keys, (ii) a voice output unit, and (iii) a control unit having a memory for storing data representing spoken words and connected to said switches, said keys, and said voice output unit, wherein said control unit is capable of assuming a plurality of operational modes and carrying out at least the following steps: (i) receiving said codes inputted via said keys into said control unit; (ii) causing the control unit to extract said data representing spoken word(s) associated with said codes from said memory; and (iii) causing the voice output unit to audibly reproduce said spoken word(s);

said operational modes comprise one or more of standby mode, setting mode, and segment operation mode;

said segment operation mode further comprises one or more of single read mode, repeat mode, continuous read mode, and semi-reset mode;

said standby mode is assumed when said POWER ON/RESET switch is pressed;

said REPEAT switch, said CONTINUOUS READ switch, and said PAUSE switch are disabled in said standby mode;

said setting mode allows for selecting a language in which said spoken words are read by pressing said LANGUAGE SELECTOR switch;

pressing said VOLUME SETTING switch or a combination of said keys allows for an increase or a decrease of the volume of spoken words or key tones audibly reproduced by said voice output unit;

optionally, pressing of any of said switches or keys causes the voice output unit to audibly display a key tone after said KEYPAD TONE SETTING switch or a combination of said keys is pressed;

said standby mode is assumed automatically after said setting mode is completed;

said code is selected from a segment code and a word code each having one or two numeric digits;

said segment code is inputted first followed by said word code;

said segment operation mode is assumed when said segment code is inputted as a two digit number, said segment code is inputted as a one digit number and no other keys are pressed for a predetermined amount of setting time, 0 is inputted, or an invalid word code is inputted;

said word code can only be inputted in said segment operation mode;

said REPEAT switch, said CONTINUOUS READ switch, and said PAUSE switch are disabled during said predetermined amount of setting time; and said standby mode is assumed when 0 or an invalid segment code is inputted, or said POWER ON/RESET switch is pressed.

2. The combination of claim 1, wherein while in a single read mode, if the word code inputted is a two digit number, a spoken word corresponding to said word code will be audibly reproduced immediately;

if the word code inputted is a one digit number, a spoken word corresponding to said word code will be audibly reproduced after said predetermined amount of setting time but only if no other switch or key is pressed during said predetermined amount of setting time;

said REPEAT switch, said CONTINUOUS READ switch, or said key(s) can be inputted during said predetermined amount of setting time, but if said REPEAT switch and said CONTINUOUS READ switch are inputted only the first inputted switch will be valid;

if one said key is inputted and no other key is pressed during said predetermined amount of setting time, a spoken word corresponding to a word code corresponding to one said digit inputted will be audibly reproduced immediately;

if multiple keys are inputted during said predetermined amount of setting time, a spoken word corresponding to a word code comprised of first two digits inputted will be audibly reproduced immediately; and said PAUSE switch is invalid.

3. The combination of claim 2, wherein, while in the single read mode, when pressing said REPEAT switch, the single read mode will be repeated once after it is finished and the semi-reset mode has been entered upon which the semi-reset mode will be entered automatically; and while in the semi-reset mode, when pressing said REPEAT switch, the single repeat mode executed last will be repeated upon which the semi-reset mode will be entered automatically.

4. The combination of claim 3, wherein while in a single read mode, when pressing said CONTINUOUS READ switch, said continuous read mode will be assumed immediately once the semi-reset mode is assumed after the operation of single read mode is finished so as to audibly reproduce spoken words starting from the word following the word currently being audibly reproduced and ending with the last word in said segment;

while in a semi-reset mode, when pressing said CONTINUOUS READ switch, said continuous read mode will be assumed immediately so as to audibly reproduce spoken words starting from the word being audibly reproduced last and ending with the last word in said segment;

the semi-reset mode will be operated automatically after the operation of continuous read mode is finished;

if the PAUSE switch is pressed during audible reproducing of words, the continuous read mode will be paused immediately once the phonation of current voice is finished;

if the PAUSE switch is pressed many times, only the odd pressings are valid;

if the PAUSE switch is pressed within the interval of setting time after the phonation of said voice is finished, the continuous read mode will be paused immediately, and will be continued by pressing the PAUSE key again;

the REPEAT switch, the CONTINUOUS READ switch, and the keys are invalid under the continuous read mode; and the continuous read mode is interrupted immediately by pressing the POWER ON/RESET key and the semi-reset mode is assumed immediately.

5. The combination of claim 4, wherein said semi-reset mode is assumed automatically after said single read mode, said repeat mode, or said continuous read mode is finished, or by pressing said POWER ON/RESET switch during said continuous read mode;

while in said semi-reset mode, the original inputted voice can be repeated or read continuously and another voice code also can be inputted; and pressing said POWER ON/RESET switch interrupts said semi-reset mode immediately and said standby mode is assumed immediately.

6. A method of interactive learning comprising:

(a) providing a combination of a book and a voice phonation apparatus comprising: a book having a plurality of pages, at least one of which is carrying a plurality of printed words and a plurality of codes associated with said words, said printed words being divided into a plurality of segments; and a voice phonation apparatus forming an integral part of said book and comprising (i) a housing with a plurality of switches and a plurality of keys, (ii) a voice output unit, and (iii) a control unit having a memory for storing data representing spoken words and connected to said switches, said keys, and said voice output unit; wherein said control unit is capable of assuming a plurality of operational modes and carrying out at least the following steps: (i) receiving said codes inputted via said keys into said control unit; (ii) causing the control unit to extract said data representing spoken word(s) associated with said codes from said memory; and (iii) causing the voice output unit to audibly reproduce said spoken word(s);

(b) inputting said codes via said keys into said control unit;

(c) causing the control unit to extract said data representing spoken word(s) associated with said codes from said memory; and (d) causing the voice output unit to audibly reproduce said spoken word(s), wherein said operational modes comprise one or more of standby mode, setting mode, and segment operation mode;

said segment operation mode further comprises one or more of single read mode, repeat mode, continuous read mode, and semi-reset mode;

said standby mode is assumed when said POWER ON/RESET switch is pressed;

said REPEAT switch, said CONTINUOUS READ switch, and said PAUSE switch are disabled in said standby mode;

said setting mode allows for selecting a language in which said spoken words are read by pressing said LANGUAGE SELECTOR switch;

pressing said VOLUME SETTING switch or a combination of said keys allows for an increase or a decrease of the volume of spoken words or key tones audibly reproduced by said voice output unit;

optionally, pressing of any of said switches or keys causes the voice output unit to audibly display a key tone after said KEYPAD TONE SETTING switch or a combination of said keys is pressed;

said standby mode is assumed automatically after said setting mode is completed;

said code is selected from a segment code and a word code each having one or two numeric digits;

said segment code is inputted first followed by said word code;

said segment operation mode is assumed when said segment code is inputted as a two digit number, said segment code is inputted as a one digit number and no other keys are pressed for a predetermined amount of setting time, 0 is inputted, or an invalid word code is inputted;

said word code can only be inputted in said segment operation mode;

said REPEAT switch, said CONTINUOUS READ switch, and said PAUSE switch are disabled during said predetermined amount of setting time; and said standby mode is assumed when 0 or an invalid segment code is inputted, or said POWER ON/RESET switch is pressed.

7. The method of claim 6, wherein while in a single read mode, if the word code inputted is a two digit number, a spoken word corresponding to said word code will be audibly reproduced immediately;

if the word code inputted is a one digit number, a spoken word corresponding to said word code will be audibly reproduced after said predetermined amount of setting time but only if no other switch or key is pressed during said predetermined amount of setting time;

said REPEAT switch, said CONTINUOUS READ switch, or said key(s) can be inputted during said predetermined amount of setting time, but if said REPEAT switch and said CONTINUOUS READ switch are inputted only the first inputted switch will be valid;

if one said key is inputted and no other key is pressed during said predetermined amount of setting time, a spoken word corresponding to a word code corresponding to one said digit inputted will be audibly reproduced immediately;

if multiple keys are inputted during said predetermined amount of setting time, a spoken word corresponding to a word code comprised of first two digits inputted will be audibly reproduced immediately; and said PAUSE switch is invalid.

8. The method of claim 7, wherein, while in the single read mode, when pressing said REPEAT switch, the single read mode will be repeated once after it is finished and the semi-reset mode has been entered upon which the semi-reset mode will be entered automatically; and while in the semi-reset mode, when pressing said REPEAT switch, the single repeat mode executed last will be repeated upon which the semi-reset mode will be entered automatically.

9. The method of claim 8, wherein while in a single read mode, when pressing said CONTINUOUS READ switch, said continuous read mode will be assumed immediately once the semi-reset mode is assumed after the operation of single read mode is finished so as to audibly reproduce spoken words starting from the word following the word currently being audibly reproduced and ending with the last word in said segment;

while in a semi-reset mode, when pressing said CONTINUOUS READ switch, said continuous read mode will be assumed immediately so as to audibly reproduce spoken words starting from the word being audibly reproduced last and ending with the last word in said segment;

the semi-reset mode will be operated automatically after the operation of continuous read mode is finished;

if the PAUSE switch is pressed during audible reproducing of words, the continuous read mode will be paused immediately once the phonation of current voice is finished;

if the PAUSE switch is pressed many times, only the odd pressings are valid;

if the PAUSE switch is pressed within the interval of setting time after the phonation of said voice is finished, the continuous read mode will be paused immediately, and will be continued by pressing the PAUSE key again;

the REPEAT switch, the CONTINUOUS READ switch, and the keys are invalid under the continuous read mode; and the continuous read mode is interrupted immediately by pressing the POWER ON/RESET key and the semi-reset mode is assumed immediately.

* * * * *